(12) United States Patent
Fox et al.

(10) Patent No.: US 11,130,078 B2
(45) Date of Patent: Sep. 28, 2021

(54) SYSTEM AND METHOD FOR SERVICING FILTER PLATES AND APPARATUS THEREOF

(71) Applicant: FLSmidth A/S, Valby (DK)

(72) Inventors: Randall Aric Fox, Stansbury Park, UT (US); Sam Cartwright, Salt Lake City, UT (US); James Chaponnel, Cottonwood Heights, UT (US)

(73) Assignee: FLSmidth A/S

( * ) Notice: Subject to any disclaimer, the term of this patent is extended or adjusted under 35 U.S.C. 154(b) by 51 days.

(21) Appl. No.: 16/760,674

(22) PCT Filed: Oct. 25, 2018

(86) PCT No.: PCT/IB2018/058348
§ 371 (c)(1),
(2) Date: Apr. 30, 2020

(87) PCT Pub. No.: WO2019/087021
PCT Pub. Date: May 9, 2019

(65) Prior Publication Data
US 2021/0220760 A1 Jul. 22, 2021

(30) Foreign Application Priority Data
Oct. 31, 2017 (DK) .......................... PA 2017 70814

(51) Int. Cl.
*B01D 25/21* (2006.01)
*B01D 25/12* (2006.01)
*B01D 35/143* (2006.01)

(52) U.S. Cl.
CPC ........... *B01D 25/215* (2013.01); *B01D 25/12* (2013.01); *B01D 35/1435* (2013.01); *B01D 2201/56* (2013.01)

(58) Field of Classification Search
CPC ........ B01D 2201/56; B01D 25/12-215; B01D 35/143; B01D 35/1435
See application file for complete search history.

(56) References Cited

U.S. PATENT DOCUMENTS 6,716,347 B1  4/2004  Davis
7,172,144 B1  2/2007  Slater et al.
(Continued)

FOREIGN PATENT DOCUMENTS

CN   202516363 U   11/2012
DE   3713419 A1    11/1988
(Continued)

OTHER PUBLICATIONS

International Search Report and Written Opinion dated Feb. 14, 2019, 10 pages.

*Primary Examiner* — Terry K Cecil
(74) *Attorney, Agent, or Firm* — Jeffrey A. Sharp

(57) ABSTRACT

A filter plate (1) comprises an opening (18) configured to receive at least one grid (2) provided within the opening (18). The at least one grid (2) comprises a body (2A) and one or more passages (2B) extending through the body (2A) for filtrate to flow through. The passages (2B) are preferably configured to allow filtrate to pass through the body (2A). The filter plate (1) may further comprise a wear detection device comprising at least one filament wire (2L) surrounding one or more passages (2B).

14 Claims, 11 Drawing Sheets

(56) References Cited

U.S. PATENT DOCUMENTS

2015/0316474 A1 11/2015 Phillips et al.
2019/0176167 A1* 6/2019 Buttler .................. G08C 17/04

FOREIGN PATENT DOCUMENTS

| JP | 2013000657 A | * | 1/2013 |
| WO | 2014/187824 A1 | | 11/2014 |
| WO | 2015/160656 A1 | | 10/2015 |

* cited by examiner

SYSTEM AND METHOD FOR SERVICING FILTER PLATES AND APPARATUS THEREOF

CROSS-REFERENCE TO RELATED APPLICATIONS

This international application claims the benefit of Danish priority application PA 2017 70814, filed on 31 Oct. 2017.

FIELD OF THE INVENTION

This application pertains to industrial filtration equipment applicable for use in the tailings, waste-water treatment, pulp and paper, and mining industries (e.g., concentrator operations, ore dressing, and mineral processing).

In particular, disclosed are novel methods and apparatus for replacing worn portions of filter plates within a filter press used for industrial filtration processes.

Moreover, disclosed are novel methods and apparatus for indicating worn filter plates within a filter press used for industrial filtration processes and identifying specific locations of wear for a filter plate.

BACKGROUND OF THE DISCLOSURE

Industrial filters may use vacuum or pressure to dewater material and form a filter cake product. In particular, industrial filter presses (such as horizontal filter presses) are used in separation processes—specifically to separate solids and liquids. The filtration process for a filter press uses the principle of pressure driving, as provided by a slurry pump. Though filter presses have many uses in the industrial, chemical, pharma, and wine-making industries, they may also be utilized to separate water from mud or to dewater tailings and/or mineral mining slurries, without limitation. Types of filter presses include plate and frame filter presses, automatic filter presses, membrane plate filter presses and recessed plate filter presses. Main process characteristics of filter presses include feed, operation, and efficiency.

Traditionally, when filtrate ports of a filter plate wear out, the entire filter plate is replaced with a new one to prevent cloth damage. Similarly, when lower portions of a filter plate wear out, it can damage filter cloths prematurely or accelerate cloth wear. Accordingly, the entire filter plate is replaced with a new one.

Accordingly, there exists a need for filtration technologies which might improve industrial filtration operations by reducing cost of operations (OPEX) and the number of occurrences of damaged media due to worn filter plate portions. Environmentally-friendly solutions which don't require total recycling of damaged, but repairable and/or serviceable filter plates are also needed.

Moreover, filter plates are often required to be removed due to erosion around the filtrate ports. Therefore, operators need to stay aware of the condition of filter plates. The erosion occurs when abrasive suspended solids pass through the filtrate ports at high velocity before entering their respective filtrate drain channel. This can occur during both filtration and air blow steps.

According to embodiments of the invention, the filter plates may be fitted with replaceable inserts so that the whole filter plate does not require replacement, but instead, an aftermarket port insert (i.e., "grid") can be purchased and installed into the filter plate, as well as removed from the filter plate and replaced with another grid.

Often the operators of a filter press fail to identify a failed filter plate until a larger problem is seen, such as more frequent cloth failures due to the media not being supported properly over the worn area.

OBJECTS OF THE INVENTION

It is, therefore, an object of the invention to circumvent the aforementioned drawbacks associated with prior art filter plates.

It is a further object of some non-limiting embodiments of the invention to extend the useful and/or serviceable life of a filter plate by providing a filter plate having one or more replaceable grids provided with one or more filtrate ports therein, without limitation.

It is yet a further object of some non-limiting embodiments of the invention to extend the useful and/or serviceable life of a filter plate by providing a filter plate having one or more replaceable lower seals, without limitation.

These and other objects of the invention will be apparent from the drawings and description herein. Although every object of the invention is believed to be attained by at least one embodiment of the invention, there is not necessarily any one embodiment of the invention that achieves all of the objects of the invention.

BRIEF SUMMARY OF THE INVENTION

Disclosed, is a filter plate 1 for a filter press, comprising one or more removable grids 2. The filter plate 1 may comprise a slurry port 19, a filtrate port 20, and a filtrate drain channel 21 intersecting the filtrate port 20. The filter plate 1 may be characterized in that it may further comprise an opening 18 configured to receive at least one grid 2. The filter plate 1 may also be characterized in that it may further comprise at least one grid 2 provided within the opening 18. The at least one grid 2 may comprise a body 2A and one or more passages 2B extending through the body 2A for filtrate to flow through.

The passages 2B may be configured to allow filtrate to pass through the body 2A, so that it can find its way to the filtrate drain channel 21 and/or the filtrate port 20, without limitation. When passages 2B in the at least one grid 2 grow as they wear out from abrasion during operation; the at least one grid 2 may be removed from the opening 18 and replaced with another grid 2 having smaller passages 2B. By replacing only the grid 2 to repair worn out filtrate passages, it may eliminate the need to completely replace the filter plate 1. The at least one grid 2 provided within the opening may comprise two grids 2, without limitation. The two grids 2 may be connected to each other. Channels 2J of a first grid 2 may communicate with channels 2J of a second grid between the two grids 2 when the two grids 2 are connected to each other. Channels 2J preferably operatively communicate with the filtrate drain channel 21.

The at least one grid 2 may comprise at least one pip 2C in the form of an outward facing protuberance, and at least one outward facing channel 21 may be defined between multiple pips 2C, without limitation.

The at least one grid 2 may also comprise at least one support 2D in the form of an inward facing protuberance (four are shown in the exemplary, non-limiting illustrated embodiment). At least one inward facing channel 2J, configured to serve as a basin for filtrate egress to a filtrate port 20 may be defined between multiple supports 2D, without limitation.

In some embodiments, the at least one grid 2 may comprise at least one standoff 2E in the form of an inward facing protuberance. Though a single grid 2 may be placed in an opening 18 extending through the filter plate 1, it is preferred (as shown) that at least one grid 2 is connected to another grid 2 via at least one fastener 7 extending through at least one respective aperture 2F. Each of the connected grids 2 may be identical to each other and symmetrically placed together in mirror fashion (e.g., with supports 2D facing each other), without limitation.

In some instances, as shown, the at least one aperture 2F may extend through the at least one standoff 2E, without limitation. However, apertures 2F configured to connect grids 2 together via one or more fasteners 7 may be situated at any practical or convenient location and at any number of practical or convenient locations on the bodies 2A of grids 2, without limitation. For example, in some preferred embodiments, a fastener 7 may extend through a passage 2B, without limitation.

The opening 18 in the filter plate may comprise a flange 24 which defines a shelf surface 23. The flange may be continuous or formed of a plurality of radially-extending protuberances extending radially-inwardly into the opening 18, without limitation. A portion of the body 2A of the at least one grid 2 may be configured to rest on the shelf surface 23. In the embodiment shown, a peripheral edge portion of body 2A is configured to rest on the shelf surface 23.

The flange 24 may, as shown, define two shelf surfaces 23 and may be configured for supporting two opposed grids 2. For example, the body 2A of a first grid 2 may rest on one of the two shelf surfaces 23, and the body 2A of a second grid 2 may rest on the other of said two shelf surfaces 23, without limitation.

The at least one grid 2 may comprise at least one countersink 2H in body 2A, the countersink 2H defining a shelf surface 2G which may support the head of a fastener 7 (e.g., a screw or bolt), a washer 9, or a nut 11, without limitation.

The at least one grid 2 may comprise at least one corner transition 2K, such as a chamfer, radius, fillet, or smoothing of a peripheral edge geometry, without limitation. It is envisaged that grid 2 may, in less-preferred embodiments, comprise a circular shape, and may therefore comprise a single curve as its at least one corner transition 2K. As shown, grids 2 comprise four corner transitions 2K.

A grid 2 for a filter plate 1 may comprise a wear detection device according to some non-limiting embodiments. The wear detection device may comprise at least one filament wire 2L surrounding one or more passages 2B and may be superficial or embedded within the body 2A. The at least one filament wire 2L may form a portion of a battery-powered onboard circuit 2M, or it may comprise a portion of an antennae (e.g., an RFID antennae). According to some embodiments, he onboard circuit 2M may comprise an RFID tag 2N which is configured to wirelessly communicate a physical and/or operational status of the filament wire 2L. Such a tag 2N may be passive or active, without limitation.

At a point in time which passages 2B widen due to wear from abrasive slurry and/or filtrate passing therethrough, the at least one filament wire 2L is preferably configured to break, thereby interrupting, disrupting, altering, or stopping an electrical current flowing therethrough, or interrupting, disrupting, altering, or stopping a signal being emitted or reflected, without limitation. Such interruptions, disruptions, alterations, or stoppages may relay or indicate that a wear threshold has been reached, and that grid 2 replacement is advisable. While not shown, LEDs, sound-emitting diodes, or the like may be used to indicate a wear status of a grid (e.g., green light="okay"; red light="worn/replace"; no sound="okay"; sound emitting="worn/replace")

A method of installing a grid 2 on a filter plate 1 is further disclosed. The method may comprise the step of placing a first grid 2 into an opening 18 having a flange 24, until a portion of the body 2A of the first grid 2 bottoms out on a shelf surface 23 of the flange 24. The method may further comprise placing a second grid 2 into the opening 18 having a flange 24, until a portion of the body 2A of the first grid 2 bottoms out on a shelf surface 23 of the flange 24. When the two grids 2 are located within the opening 18, the first grid 2 may be connected to the second grid 2.

According to some embodiments, the method of installing a grid 2 on a filter plate 1 may comprise placing a first grid 2 into an opening 18 of the filter plate 1, the opening 18 having a flange 24, until a portion of the first grid 2 bottoms out on a shelf surface 23 of the flange 24. Thereafter, a second grid 2 may be placed into the same opening 18 having a flange 24, until a portion of the second grid 2 bottoms out on an opposing shelf surface 23 of the flange 24. The first grid 2 may be connected to the second grid 2 to fill the opening 18 of the filter plate 1.

The step of connecting the first grid 2 to the second grid 2 may comprise placing a fastener 7 through an aperture 2F extending through the body 2A of the first grid 2, and then through an aperture 2F extending through the body 2A of the second grid 2.

In some embodiments, the step of connecting the first grid 2 to the second grid 2 may comprise connecting a second complementary fastener 9, 11 to the fastener 7. In some embodiments, the step of connecting the first grid 2 to the second grid 2 may comprise securing the fastener 7 to the body 2A and aperture 2F of the second grid 2.

Depending on what type of fastener 7 is preferred, the step of securing the fastener 7 may differ. For example, securing the fastener 7 to the body 2A and aperture 2F of the second grid 2 may comprise threading the fastener 7 into the body 2A and aperture 2F of the second grid 2, wherein the aperture 2F is threaded or configured to be threaded by self-tapping by the fastener 7. Or, the step of securing the fastener 7 to the body 2A and aperture 2F of the second grid 2 may comprise expanding the fastener 7 within the body 2A and aperture 2F of the second grid 2, wherein friction between the fastener 7 and aperture 2F holds the fastener 7 to the body 2A and aperture 2F of the second grid 2. Or, the step of securing the fastener 7 to the body 2A and aperture 2F of the second grid 2 may comprise turning the fastener 7 less than one revolution and capturing the fastener 7 within the body 2A and aperture 2F of the second grid 2, the fastener 7 engaging a track provided in the aperture 2F of the second grid 2 (e.g., via a "quarter-turn" fastener mechanism or the like). Alternatively, the step of securing the fastener 7 to the body 2A and aperture 2F of the second grid 2 may comprise engaging a portion of the fastener 7 with a detent or groove provided in the body 2A and aperture 2F of the second grid 2 (e.g., via a quick release detent, ball lock, or "pip" pin mechanism), without limitation.

In some preferred embodiments, as shown, the fastener 7 may be externally-threaded (i.e., provided in the form of a bolt or screw), and the second fastener 11 may be internally-threaded (i.e., provided in the form of a complementary nut). In such embodiments, the method may further comprise the step of bottoming a head of the fastener 7 on a shelf portion 2G of a countersink 2H in the body 2A of the first grid 2. Thereafter, the second fastener 11 or a washer 9 may be rested on a shelf portion 2G of a countersink 2H in the body 2A of the second grid 2. A clamping force between the fasteners 7, 11 may hold the two grids 2 together and to the filter plate 1 as shown and described hereinafter.

A filter plate 1 according to embodiments of the invention may be characterized in that it may comprise a wear detection device. The wear detection device may comprise at least one filament wire 2L surrounding one or more passages 2B that operatively communicate with a filtrate drain channel 21 and/or a filtrate port 20. The wear detection device may form a portion of a battery-powered onboard circuit 2M.

The onboard circuit 2M may comprise a diode which is configured to wirelessly communicate a signal 2P for relaying or indicating a physical and/or operational status of the filament wire 2L. The signal 2P may be electromagnetic in nature, and may comprise a sound or light signal, without limitation. In some embodiments, the onboard circuit 2M may comprise an RFID tag 2N which is configured to wirelessly communicate a signal 2P for relaying or indicating a physical and/or operational status of the filament wire 2L. The signal 2P may comprise a carrier radio frequency within the RFID spectrum as well as a grid 2 identifier number and/or operational status information, such as a Boolean "true" (i.e., "1") or "false" (i.e., "0") "worn" condition indicator value. In other words, the physical and/or operational status of the filament wire 2L may include a Boolean "worn" condition indicator, that is "false" when wear to the passages (2B) are within acceptable operating range, and that is "true" when wear to the passages (2B) has exceeded a predetermined threshold. A "true" value may be relayed if the filament wire 2L is intact and operational. A "false" value may be relayed if the filament wire 2L has been compromised, damaged, or inoperable.

When wear detection is employed, the circuit 2M and signal 2P may be configured to electronically automatically re-order a replacement filter plate (1) or a replacement grid (2) for the filter plate (1), without limitation. This might happen, for example, when said worn condition indicator becomes "true". In addition, or alternatively to the aforementioned, when wear detection is employed, the circuit 2M and signal 2P may be configured to electronically automatically add a replacement filter plate (1) or a replacement grid (2) for the filter plate (1) to an electronic shopping cart, without limitation. This similarly might occur when said worn condition indicator becomes "true". Re-ordering and/or shopping cart changes may be made possible via an integrated digital store. The digital store may be managed on a remote server and be accessible via the Internet by a CPU which wirelessly communicates with grids 2 via wireless RFID signals, without limitation.

A filter plate 1 for a filter press is further disclosed. The filter plate 1 may comprise a slurry port 19, a filtrate port 20, and, a filtrate drain channel 21 intersecting the filtrate port 20. The filter plate 1 may be characterized in that it further comprises a recess 26 along at least a bottom edge portion of the filter plate 1; and a sealing edge 3 positioned within the recess 26, without limitation. The sealing edge 3 may be configured to compress and seal against filter media along the bottom edge portion of the filter plate 1. The sealing edge 3 is configured to wear from abrasion during operation; and, after the sealing edge 3 has been damaged or worn, it may be removed from the recess 26 and replaced with another new or replacement sealing edge 3—thereby eliminating the need to completely replace the filter plate 1 or frequently replace filter media due to a roughened or damaged bottom edge portion of the filter plate 1.

In some embodiments of a filter plate 1, two recesses 26 may be provided at the bottom edge portion of the filter plate 1, without limitation. In such embodiments, two sealing edges 3 may be provided to the filter plate 1; wherein a sealing edge 3 may be placed in (and/or secured to) each of the two recesses 26, without limitation. The two sealing edges 3 may be connected to each other via one or more fasteners 8 extending therebetween. Each fastener 8 may extend through a passage 3C of each sealing edge 3. According to some embodiments, a sealing edge 3 described herein may comprise a soft body 3A portion, and a stiffer or different material substrate 3B between the body 3A and filter plate 1. The substrate 3B might assist with mounting purposes or help support body 3A, without limitation.

BRIEF SUMMARY OF THE DRAWINGS

To complement the description which is being made, and for the purpose of aiding to better understand the features of the invention, a set of drawings illustrating new and novel methods and apparatus for improving industrial filtration processes is attached to the present specification as an integral part thereof, in which the following has been depicted with an illustrative and non-limiting character. It should be understood that like reference numbers used in the drawings (if any are used) may identify like components.

FIGS. 9 and 10 suggest exemplary, non-limiting embodiments which employ a "smart" grid for wireless wear monitoring of filtrate ports, without limitation; wherein at least one filament wire is provided around one or more passages which are configured for filtrate to flow through.

In the following, the invention will be described in more detail with reference to drawings in conjunction with exemplary embodiments.

DETAILED DESCRIPTION

While the present invention has been described herein using exemplary embodiments of a replaceable filtration device for a filter plate and a method of installing the same, it should be understood that numerous variations and adaptations will be apparent to those of ordinary skill in the field from the teachings provided herein.

The detailed embodiments shown and described in the text and figures should not be construed as limiting in scope; rather, all provided embodiments should be considered to be exemplary in nature. Accordingly, this invention is only limited by the appended claims.

The disclosure of every patent, patent application, and publication cited, listed, named, or mentioned herein is hereby incorporated by reference in its entirety, for any and all purposes, as if fully set forth herein.

While this subject matter has been disclosed with reference to specific embodiments, it is apparent that other embodiments and variations can be devised by others skilled in the art without departing from the true spirit and scope of the subject matter described herein. The appended claims may include some, but not all of such embodiments and equivalent variations.

The described embodiments are to be considered in all respects only as illustrative and not restrictive. The scope of the invention is, therefore, indicated and governed only by the appended claims, rather than by the foregoing description. All embodiments which come within the meaning and range of equivalency of the claims are to be embraced within their scope.

The inventors have recognized a novel and heretofore unappreciated method of servicing filter plates 1—in particular, those used in filter presses (e.g., those used in a horizontal automatic filter press, without limitation).

Figure 1:
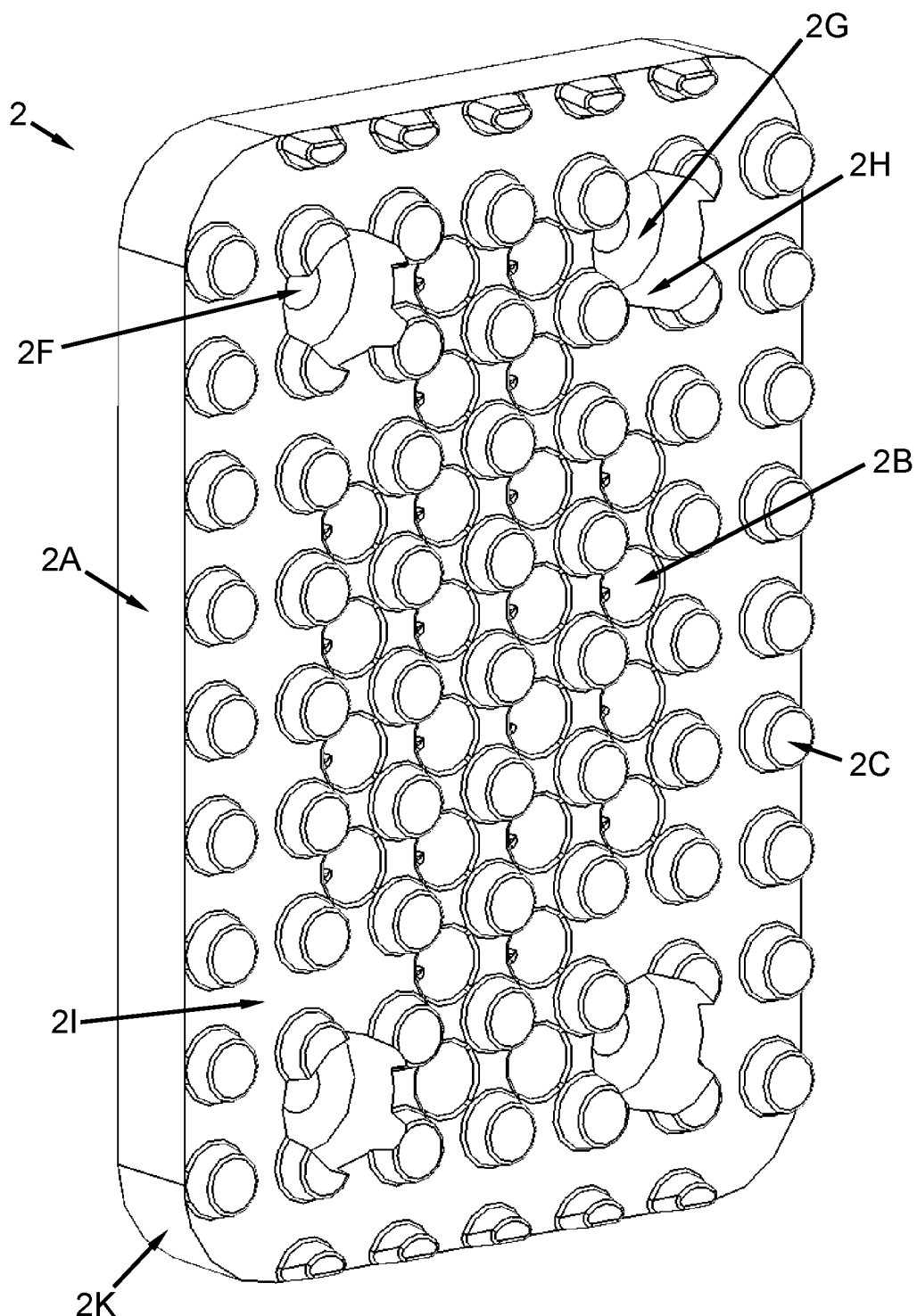
FIG. 1 illustrates an outer filter media-engaging surface of exemplary, non-limiting embodiment of a grid for a filter plate assembly 1 employing inventive concepts.
Figure 2:
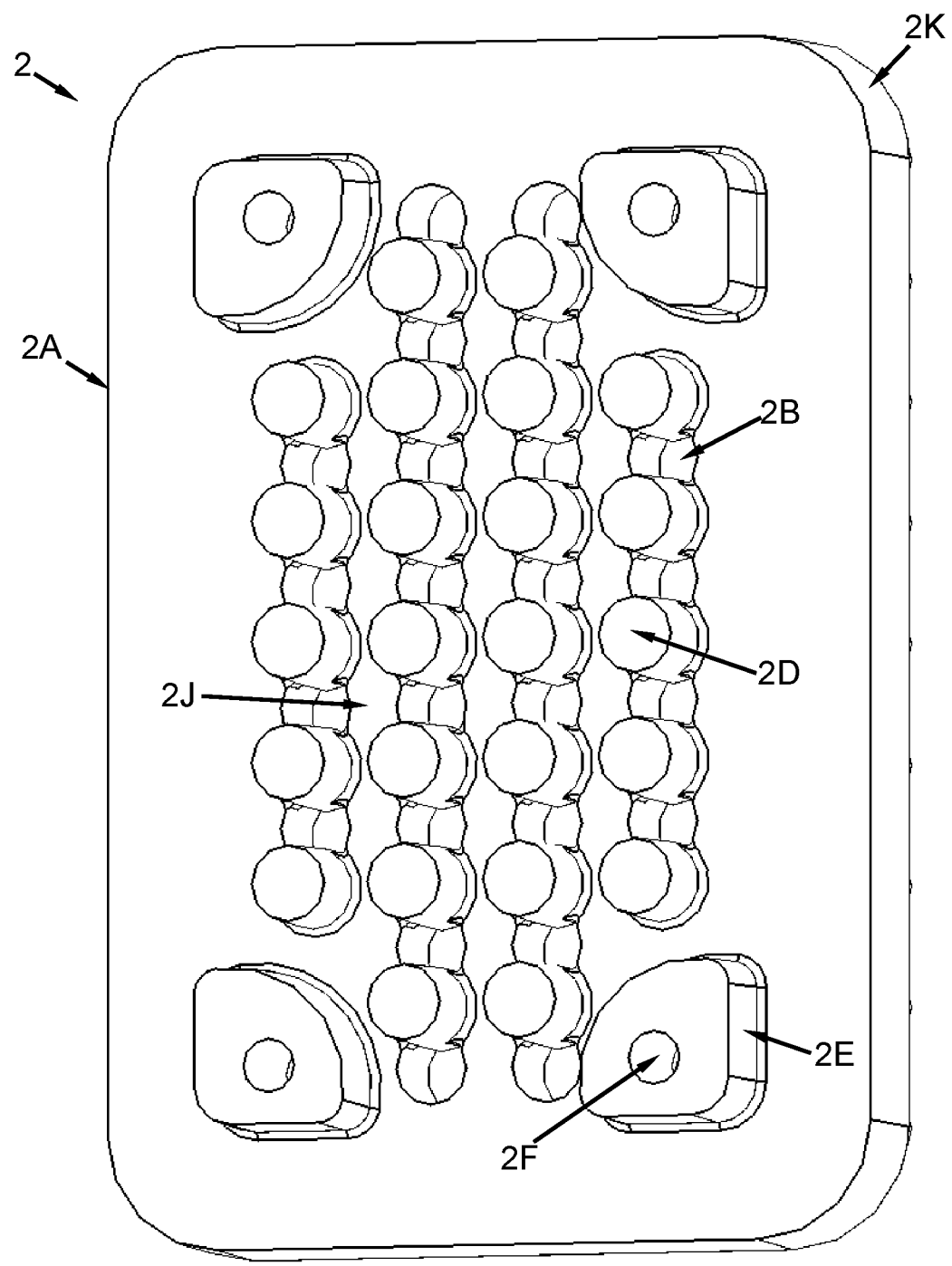
FIG. 2 illustrates an inner, filtrate-channel facing/communicating surface of the grid shown in FIG. 1.
Figure 3:
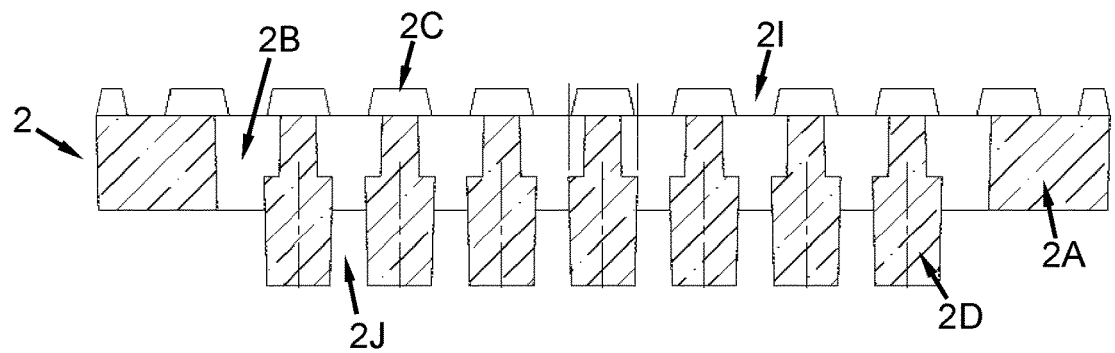
FIG. 3 shows a cross-sectional view of the grid shown in FIGS. 1 and 2.
Figure 4:
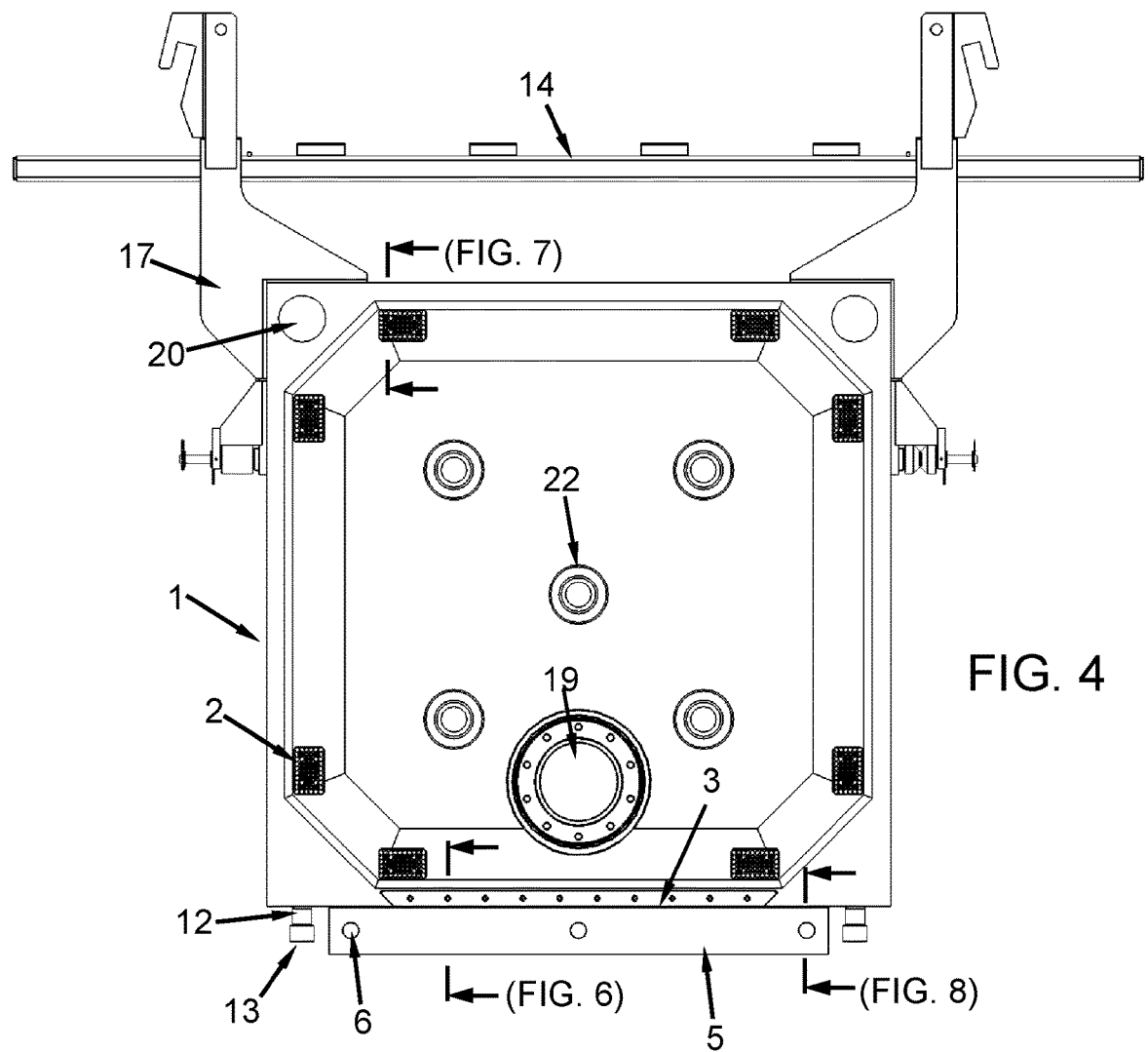
FIG. 4 illustrates a plurality of grids 2 installed in a plurality of openings 18 extending through a filter plate 1 and being fitted within the openings 18 to provide a modular filter plate 1 which is configured for easily replacing wear-prone areas.

Turning now to FIGS. 1 and 2, a grid 2 for fitment within a filter plate 1 according to embodiments of the invention is shown. The grid 2 and/or the filter plate 1 may comprise one or more of the numbered elements depicted in any combination, and it should be understood by those ordinarily skilled in the art that any number of permutations or derivatives from what is shown is anticipated. The grid 2 or filter plate 1 may, in some instances, omit one or some of the numbered elements as a matter of preference or engineering design choice; or, a grid 2 or filter plate 1 may, in some instances comprise more features than what is shown, without limitation.

The filter plate 1 described herein may be configured for any type of pressure-based filter press which utilizes a chamber, without limitation. Grids 2 described herein may serve as means for easily removing and replacing portions of the filter plate 1 which are prone to premature wear which can cause filtration media (e.g., filter cloth) damage, without limitation. These portions which are prone to wear typically include sections of a filter plate 1 comprising passages which connect to a filtrate drain channel 21 and channel filtrate to a filtrate port 20.

Filter plate 1 may comprise a slurry port 19 (i.e., feed eye opening) for slurry transport, one or more filtrate ports 20, and one or more stay bosses 22 protruding from a face of the filter plate 1. The filter plate may further comprise a pipe (e.g., 2" NPT on both ends) having a cap 13. The filter plate may be supported by one or more handles which may be guided 15 and/or non-guided 16, without limitation. Mounting brackets 17 provided to the filter plate 1 may extend therefrom and support a cloth attachment bar 14. Corners of the filter plate 1 may comprise a filtrate port 20 operatively communicating with filtrate drain channels 21.

Each grid 2 may be comprised of a body 2A, which is configured to be received in an opening 18 of a filter plate 1. As shown, the opening 18 in the filter plate 1 may comprise a flange 24 comprising opposing shelf surfaces 23, without limitation. The flange 24 may be a continuous annular flange or inner ridge provided halfway through the opening 18 as shown. However, various flange 24 configurations are anticipated—including those which may be offset, asymmetrical, or provided by a series of radially-inwardly extending protuberances forming an interrupted/discontinuous annulus, without limitation.

In some embodiments, grids 2 described herein may comprise or may be formed of polymeric (e.g., rubber, plastic, polyurethane, polyethylene), metallic, ceramic, or composite (e.g., cermet, carbon fiber, fiberglass), without limitation. Grids 2 may be formed of substantially the same material as the rest of filter plate 1, or, may be formed of different materials. For example, in some embodiments, grids 2 may be formed of a more robust wear-resistant material than other portions of the filter plate 1, without limitation.

Each grid 2 may comprise a number of passages 2B for filtrate to pass from a media-facing side of the body 2A to a filtrate drain channel 21-facing side of the body 2A. Preferably, a plurality of passages 2B are provided through body 2A.

The body 2A may comprise, on a media-facing side of the body 2A, a number of pips 2C provided as outward facing protuberances. On the opposite filtrate drain channel-facing side of the body 2A, a number of supports 2D provided as inward-facing protuberances may extend from other portions of the body 2A. A number of standoffs 2E also provided as inward facing protuberances may extend from other portions of the body 2A.

A number of special apertures 2F may be provided to each grid 2 for purposes of mounting a fastener 7 therein. However, it should be known that passages 2B may serve the dual function of accommodating filtrate passage and also for accepting fasteners 7), without limitation.

A shelf surface 2G may be provided to an aperture 2F by virtue of a countersink 2H, without limitation. The shelf surface 2G may allow a head or flange of a fastener 7 to bottom out thereon, and provide support to a fastener 7, 9, 11. The countersink 2H may provide clearance for a fastener 7, 9, 11—such as a flange, head, or body portion without limitation.

A number of outward-facing channels 2I may be provided on the media-facing side of the body 2A, and may extend between the pips 2C. A number of inward-facing channels 2J may be provided on the non-media-facing/filtrate drain channel 21 side, and they may extend between the supports 2D, without limitation.

A grid 2 may take the form of any practical shape. As shown, a grid 2 may be provided in rectangular form, and may comprise one or more radius transitions 2K (e.g., edge shape, tapering, smooth fillet, chamfer, radius, or the like), without limitation.

Figure 14:
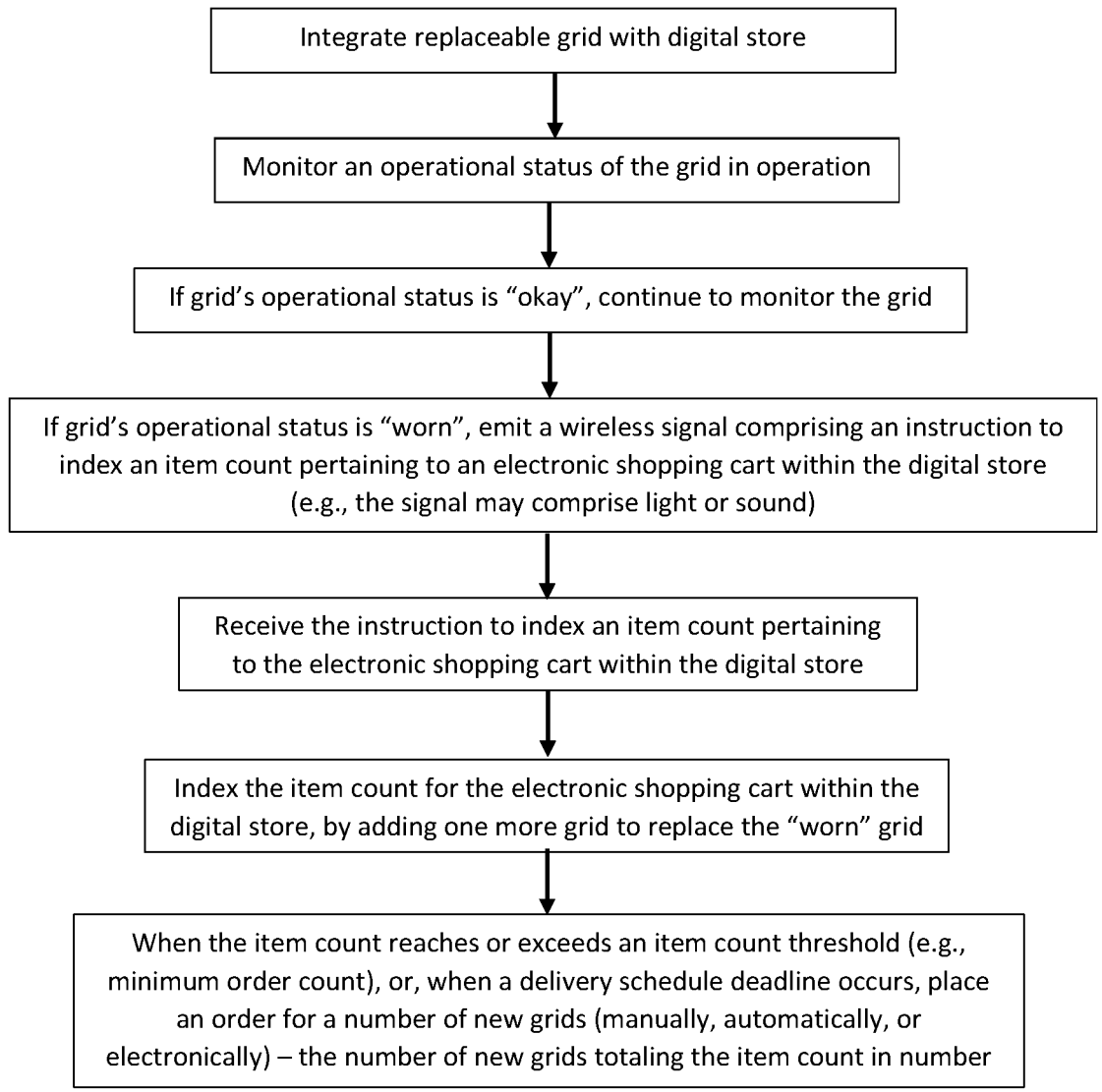
FIG. 14 suggests a method of automatically re-ordering one or more grids 2 for a filter plate 1 according to some non-limiting embodiments.

As demonstrated in exemplary, non-limiting embodiment shown in FIGS. 9-12 and further discussed in FIG. 14, one or more filament wires 2L may be provided to a grid 2, without limitation. A filament wire 2L may be sized, positioned, or otherwise configured to break when filtrate passages 2B in the body 2A grow and wear out due to abrasion/erosion. One or more filament wires 2L may form a portion of an onboard circuit 2M provided to a grid. The circuit 2M may comprise a battery, and a processor, without limitation. In some embodiments, the circuit 2M may comprise an RFID tag 2N for wireless tracking, inventory management, and/or wear monitoring, without limitation. In some preferred embodiments, the RFID tag 2N may be used for alerting and/or reporting a status of filament wire 2L which is at least partially representative of an operational status of the grid 2 (e.g., "okay" grid status or "worn" grid status).

Onboard circuit 2M may be configured to emit a wireless signal 2P, such as an alarm signal or True/False "worn" flag. The wireless signal 2P may comprise grid identification information, cycle count information, grid location information (e.g., plate number, plate side, type of plate, plate quadrant, filter number, or the like), and/or operational status information (e.g., "okay" or "worn"), without limitation.

Figure 5:
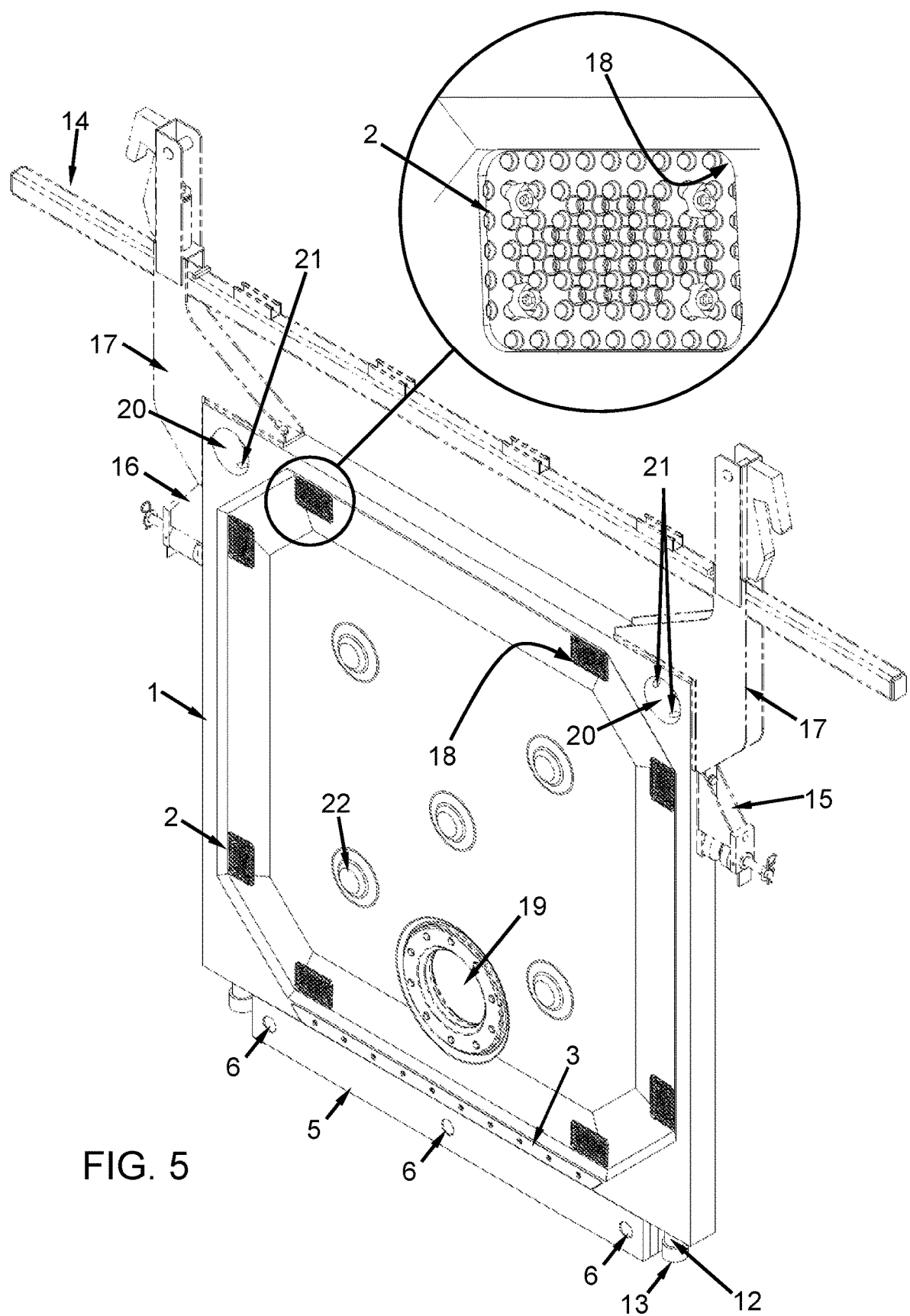
FIG. 5 is an isometric view of FIG. 4 showing grids 2 installed in a filter plate 1 according to some embodiments.
Figure 6:
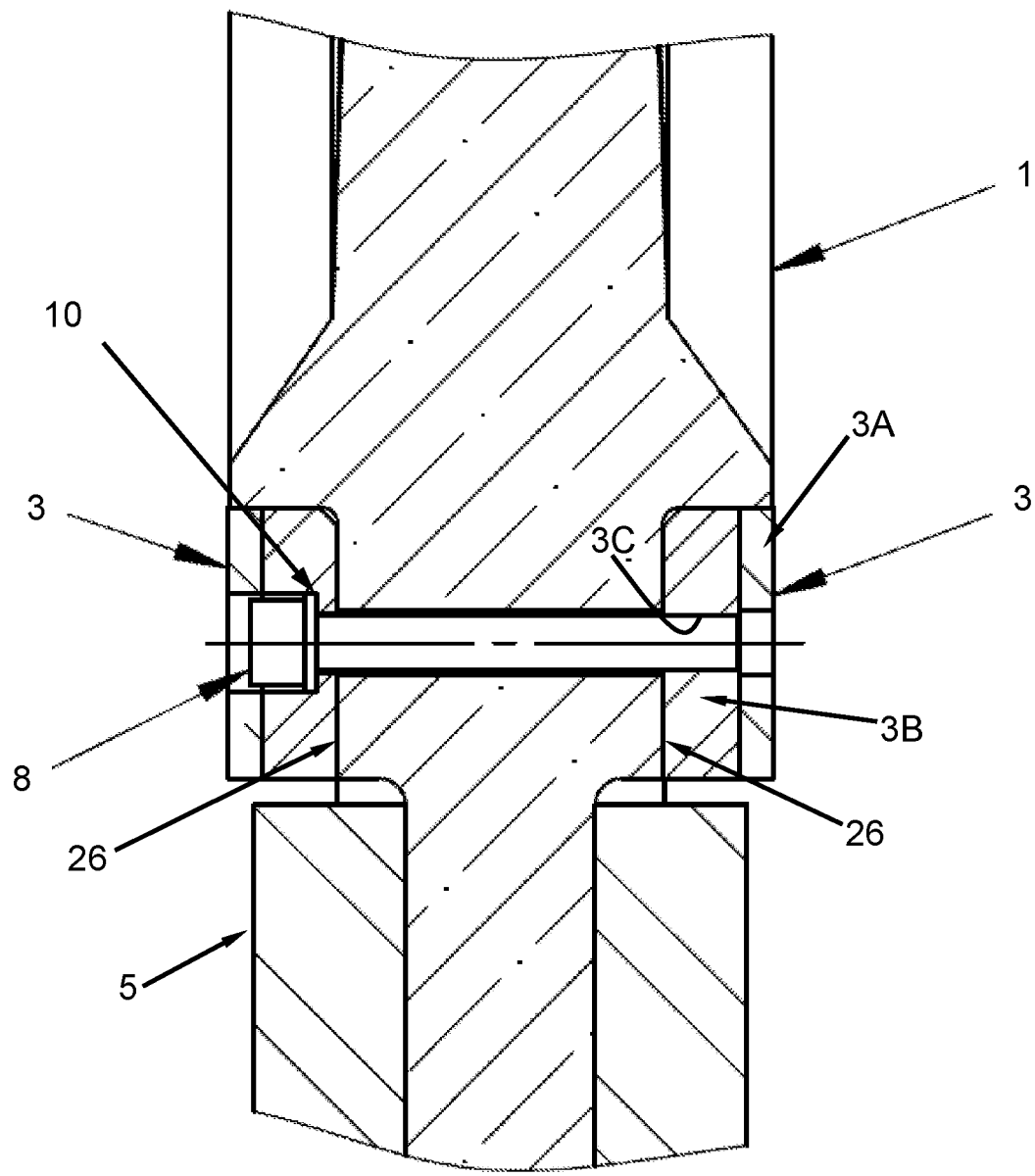
FIG. 6 is a first partial cross-sectional view of FIG. 4.

According to some embodiments, a lower replaceable sealing edge 3 may be provided to a filter plate 1 as suggested in FIGS. 5 and 6. The sealing edge 3 is preferably formed of a soft, but stiff low durometer polymeric material (e.g., polyurethane, natural rubber, thermoplastic rubber, vulcanized rubber, silicone or the like); however, it could comprise higher durometer polymer or copolymer (e.g., polyethylene), without limitation. According to some embodiments, the sealing edge 3 may comprise a firm material having a relatively low-durometer (e.g., Shore A 74a-84a), without limitation. Durometer of the sealing edge 3 may be adjusted to optimize compromises between rigidity, flexibility, compressibility, longevity, and sealing characteristics along a backside of filter media during plate closure in a filter press.

The sealing edge 3 may be attached to a filter plate 1 via one or more fasteners 8, without limitation. A fastener 8 may comprise, for example, a screw, a bolt, a cap head, a hexagonal socket head machine screw, a quarter turn fastener, a rivet, a ferrule-based snap fit fastener, a weld stud, or the like, without limitation. If the fastener 8 has a head, a washer 10 (e.g., a flat washer, spring washer, or anti-rotation washer) may be provided thereunder, without limitation.

Figure 8:
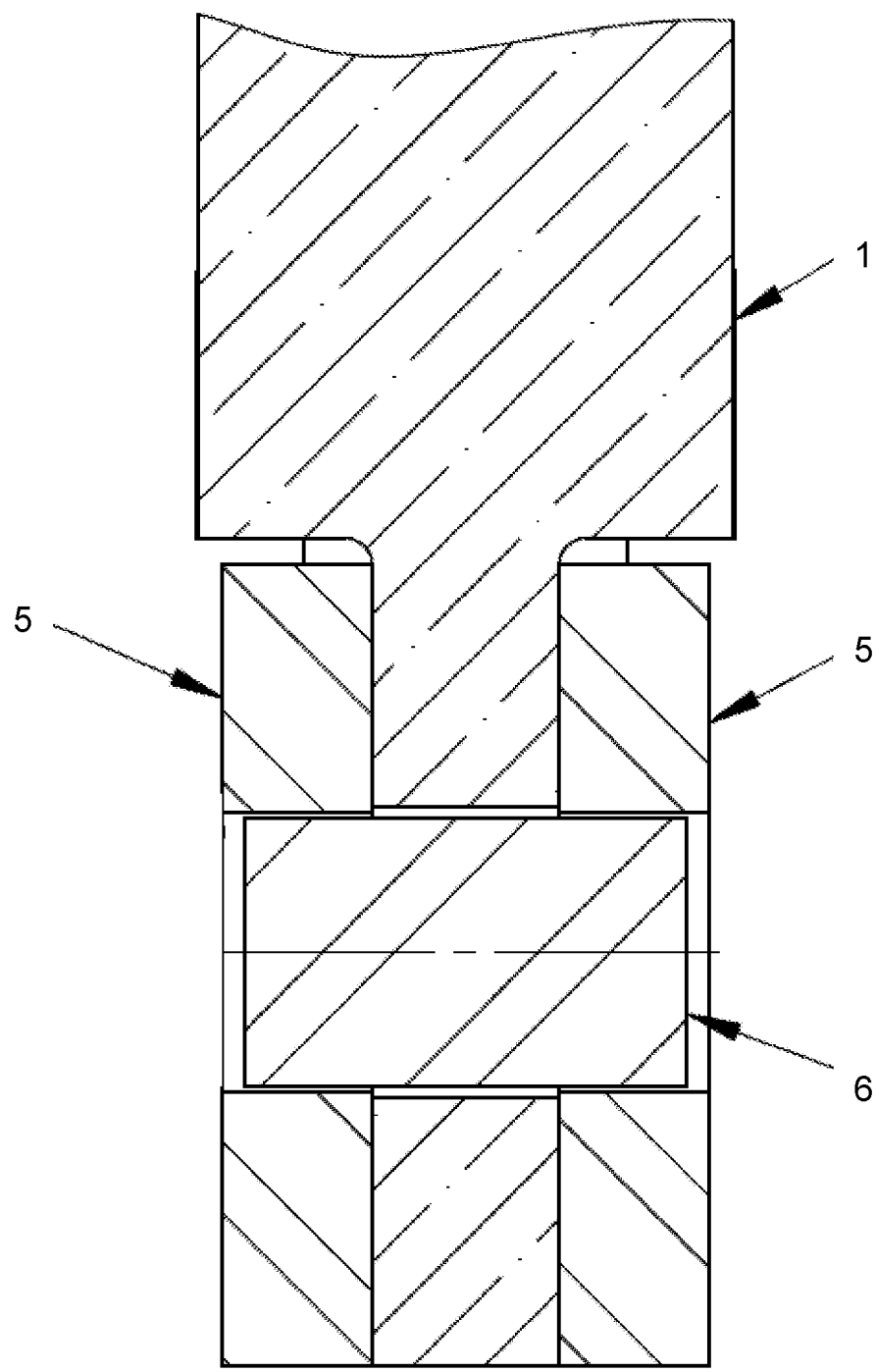
FIG. 8 is a third partial cross-sectional view of FIG. 4.

Two sealing edges 3 may be provided to a lower portion of a filter plate 1 (e.g., above a counter weight 5), without limitation. As shown in FIG. 8, counterweight 5 may be held to a filter plate using a number of pins 6, such as weld pins or studs, or interference pins, without limitation. Alternatively, fasteners 7, 8 described herein may be used, without limitation.

As suggested in FIG. 6, sealing edge 3 may comprise a body 3A. Optionally, a substrate 3B may be provided to the body 3A for mounting or as a support backing. Substrate 3B and body 3A may be formed of dissimilar materials. For example, optional substrate 3B may be formed of metal or hard plastic, without limitation. The body 3A of a sealing edge 3 may be directly attached to the filter plate 1 with adhesive or retaining clips, without limitation. If employed, the substrate 3B of a sealing edge 3 may be directly attached to the filter plate 1 with adhesive or retaining clips, without limitation. Sealing edges 3 may be provided on both sides of a filter plate 1, and may sit in a recess 26 provided in the body of the filter plate 1 as shown. It is important that sealing edges 3 are configured such that their bodies 3A can compress and allow filter plates 1 to contact each other without binding or interference. One or more passages 3C may be provided through a sealing edge 3 to allow fasteners 8 to pass therethrough.

Figure 7:
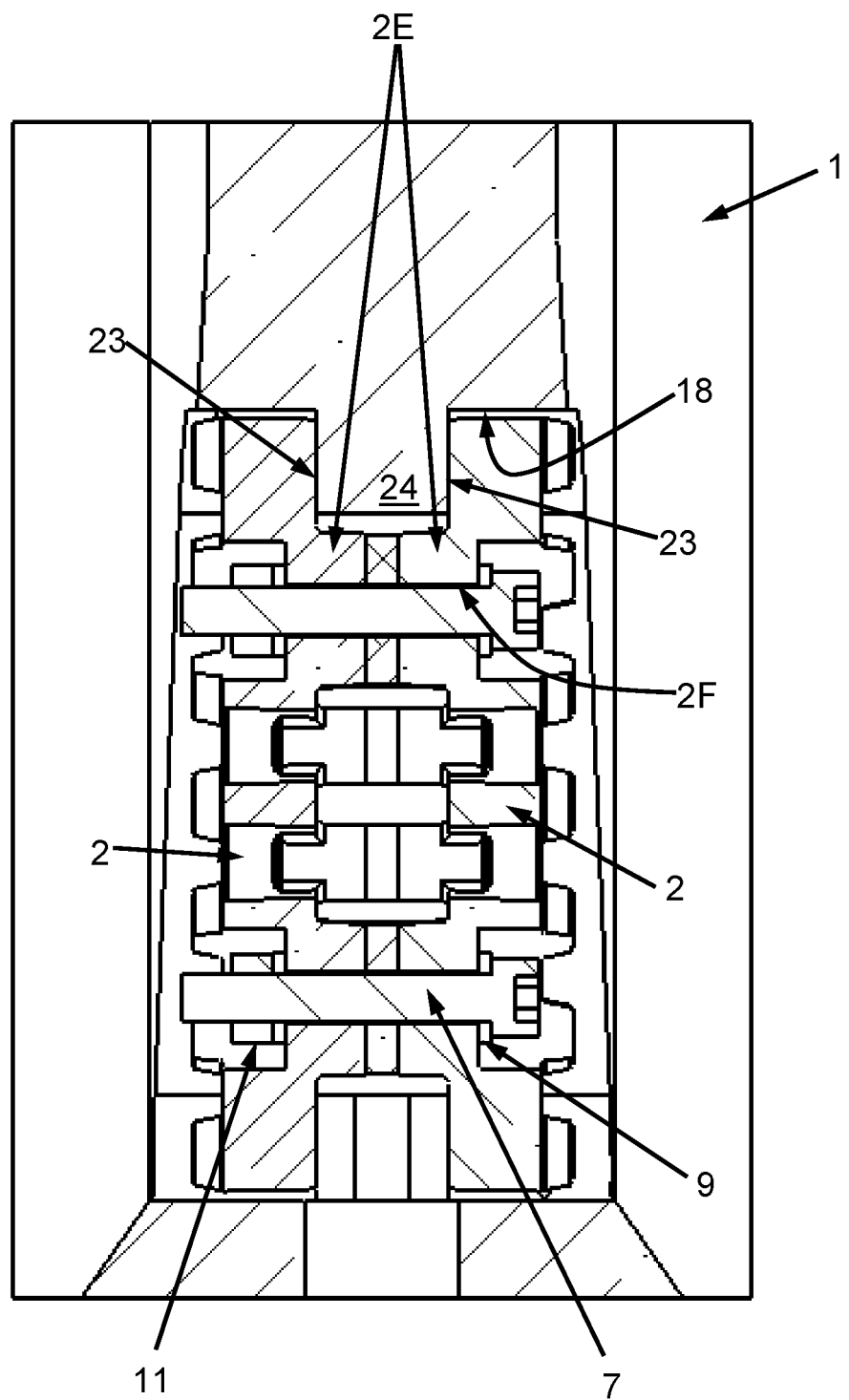
FIG. 7 is a second partial cross-sectional view of FIG. 4.

As suggested in FIG. 7, grids 2 may be locked together within an opening 18 of a filter plate 1 via threaded fasteners 7, nuts 11, and washers 9, 11, without limitation. Washers 9, 10 may comprise flat washers, anti-rotation washers, spring locking washers, or the like, without limitation.

According to some embodiments, wear detection means may be provided to a grid 2 as suggested in FIGS. 9-12. It should be understood that while the application of such means may be particularly advantageous for use with grid 2 bodies 2A, the means for wear detection may be equally relevant to conventional filter plates which might not have removable grids 2 installed thereon according to embodiments shown, and which might instead have filtrate ports drilled into their monolithic body to intercept a filtrate drain channel.

Embodiments of wear detection means may utilize an RFID chip, tag, or other passive or active electronic communication device 2N that comprises an antenna capable of at least delivering a wireless signal 2P, without limitation. The electronic communication device 2N may be part of a larger electronic circuit 2M having a battery, logic board/processor, and/or memory, without limitation. One or more filament wires 2L may be provided around passages 2B in the body 2A of a grid 2, and the filament wire(s) 2L may form a portion of the electronic circuit 2M or electronic communication device 2N.

Figure 9:
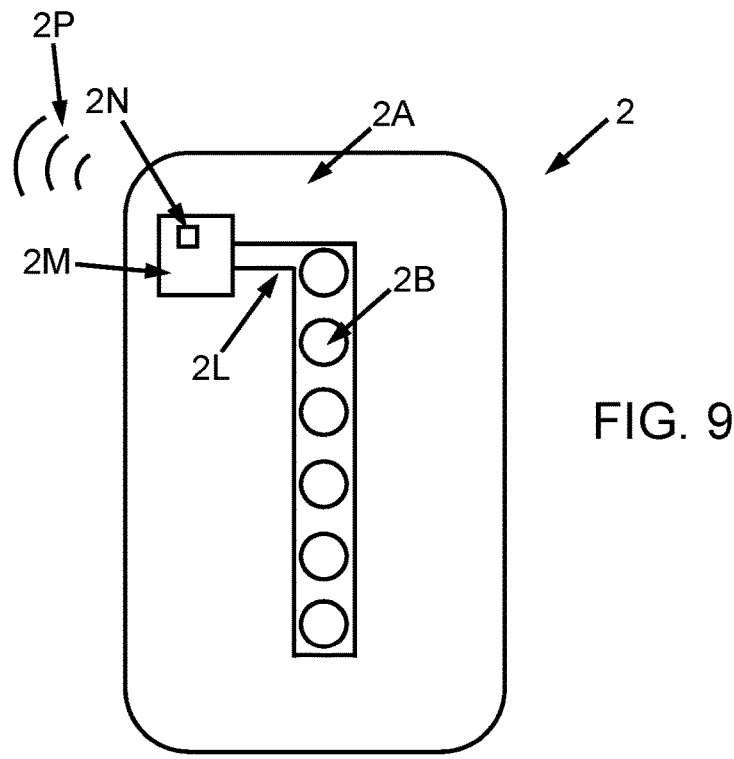
Figure 10:
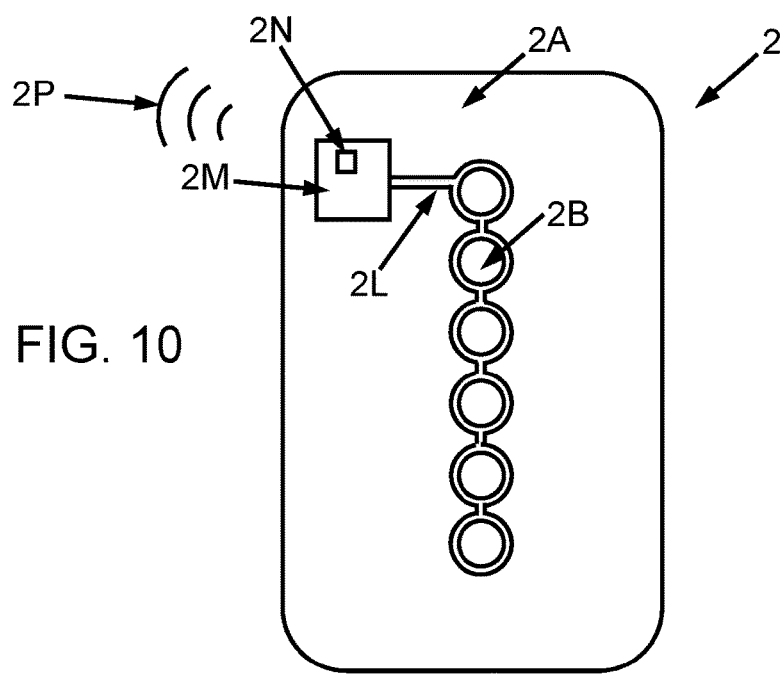
Figure 11:
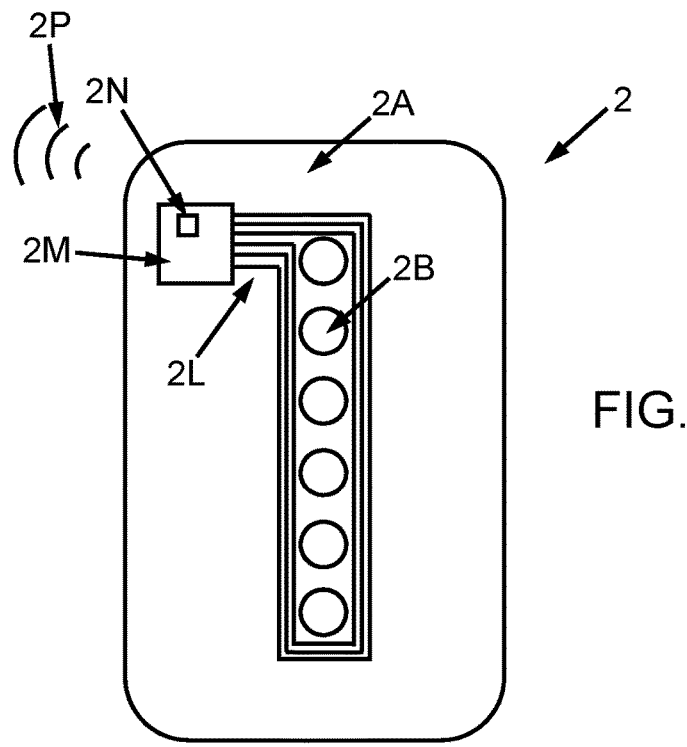
FIGS. 11 and 12 suggest exemplary, non-limiting embodiments which employ a "smart" grid 2 for wireless wear monitoring of filtrate ports, without limitation; wherein multiple filament wires 2L are nested and provided around one or more passages 2B which are configured to allow filtrate to flow through the body 2A of the "smart" grid 2.
Figure 12:
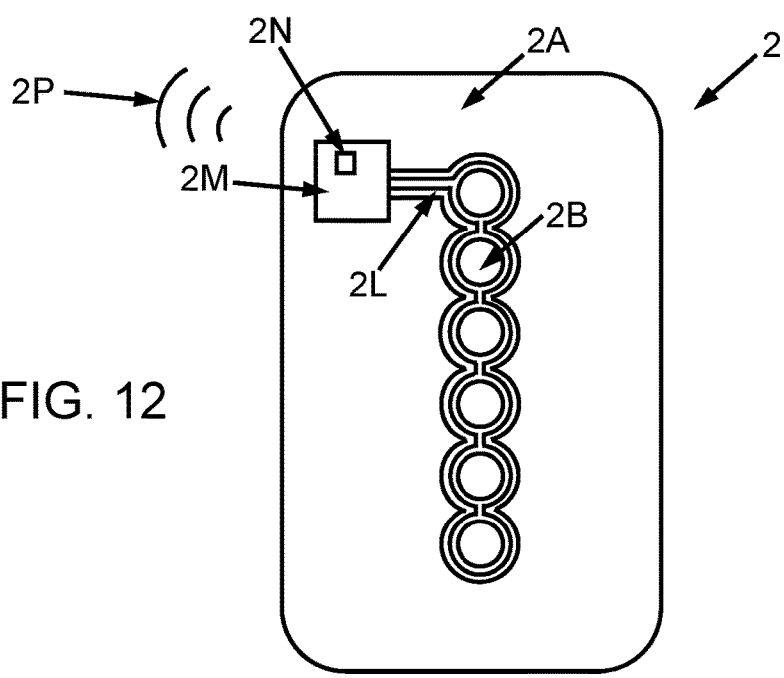

FIGS. 9 and 10 show potential embodiments including series circuits; wherein if the single filament wire 2L breaks, the electronic communication device 2M can change or disrupt its signal 2P, thereby indicating a wear threshold of at least one passage 2B has been met or exceeded, without limitation. The indication may involve a digital alarm such as the emission of a sound/radio wave (e.g., from sound diode), the emission of a light wave (e.g., from LED), the emission of an electronic signal, or a ceasing of an electronic signal being emitted, without limitation. The digital alarm may survive destruction of the filament wire 2L according to some embodiments. FIGS. 11 and 12 show potential embodiments including parallel circuits, without limitation. As the passages 2B wear out and grow (radially) in size, and as each of multiple nested filament wires 2L break, the electronic communication device 2M can change or disrupt its signal 2P, thereby indicating a wear "progression" of passages 2B through a range of several predetermined wear thresholds, without limitation. A status indicator, such as "normal", "worn", and "replace" may be relayed, based upon which filament wires 2L are compromised (e.g., with a greater number of broken circuits representing higher wear), without limitation.

With embodiments using a single filament wire 2L, current from a small onboard battery associated with the circuit 2M can be passed through the filament wire 2L. When the single filament wire 2L fails due to wearing of passages 2B (i.e., "opening" or "widening" of passages 2B), the current may stop flowing due to one or more interruption or disjoint in the filament wire 2L. With embodiments using a plurality of filament wires 2L, current from a small onboard battery associated with the circuit 2M can be passed through each of the filament wires 2L. When a single filament wire 2L fails due to wearing of passages 2B (i.e., "opening" or "widening" of passages 2B), the current may stop flowing in that particular filament wire 2L, due to one or more interruption or disjoint in the respective filament wire 2L. Changes in current, voltage, or resistance within both parallel and series circuit embodiments may be measured and interpreted by a processor/logic board of the electronic circuit 2M to determine a wear status of one or more passages 2B.

In some embodiments, the one or more filament wires 2L may comprise portions of the electronic communication device 2M, such as one or more portions of an RFID antennae which is configured to emit or reflect signals 2P. This antennae may be provided in the form of one or more filament wires 2L running around the perimeter of the passages 2B, thereby forming one or more circuits 2M. As the passages 2B begin to erode, the filament wire 2L will also be eroded as the diameter of the passages increase. Once the filament wire 2L antenna is eroded to a point in which the circuit 2M is broken, it may cease to operate, sending a signal to the plant operating system advising that the removable grid or filter plate associated therewith is in need of being removed from the filter plate and/or needs replacing or repair. The signal may include an advisement that a worn filter plate be replaced and/or that one or more grids 2 associated with a worn filter plate should be re-ordered, without limitation.

Filter plate wear detection means can be used with filter plates in filter presses (e.g. vertical filter presses, horizontal filter presses, automatic filter presses, plate and frame filter presses, FLSmidth® AFP-IV automatic filter press), or other filtration apparatus (e.g., a Pneumapress® filter which comprises plates having a grid below the cloth that could be fitted with wear detection), without limitation. The wear detection devices can detect wear in areas in which filter plates are prone to suffer from erosion and may alert the plant operator of the problem.

By employing the novel apparatus and practicing the inventive methods, it may be possible to gather data that identifies "trends" within a filter press or "trends" of a particular filter plate or filter plate design operating within a filter press. Failures and successes may be carefully monitored, and certain zones within the filter that are more susceptible to wear from erosion can be identified, thereby guiding smart modifications such as altering porting designs to be more effective and wear resistant and/or changing layout configurations or locations for passages 2B which may help improve filter plate 1 performance. Such data may lead to efforts to find better solutions to existing problems.

The novel apparatus and methods, when practiced, may also reduce the amount of filter downtime because an operator or controller can be alerted when the passages 2B on any given filter plate are outside of an acceptable/tolerable range. This means that the passages 2B can be replaced or repaired before more service time is lost through premature media failure (if the problem isn't quickly identified and fixed in a timely fashion).

The grid 2 devices shown herein may also be configured to be trackable or traceable by QR code, serial number, or RFID, without limitation. In this regard, a grid 2 may be able to be checked into a client user's inventory system so that the client user is able to confirm how many grid 2 devices are currently installed, in which filter presses they are currently installed, when a grid device 2 was last replaced, how many cycles a grid 2 device has completed, and how many replaceable grids 2 are in warehouse storage and ready to be used as spares, without limitation. If necessary, trending data will be able to be used to predict the failures of the ports, allowing the plant operators to order new inserts in a timely manner. Emission of a wireless signal 2P by the circuit 2M may initiate an automatic increase in quantity of an electronic checkout cart, or may immediately order a replacement grid 2 for the client user, without limitation.

Figure 13:
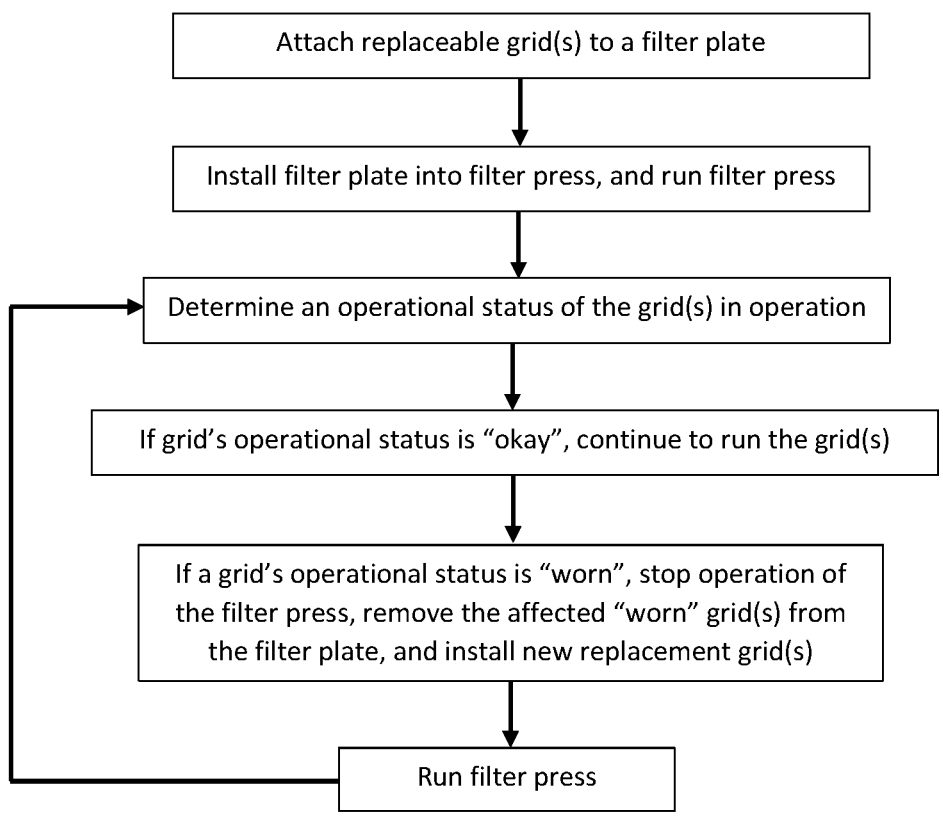
FIG. 13 suggests a method of installing and/or re-installing one or more grids 2 for a filter plate 1 according to some non-limiting embodiments.

As suggested in FIG. 13, grids 2 may be installed in a filter plate 1 for a filter press. The filter plate may be placed into service (e.g., installed into a filter press, with filtration media applied thereto, and then run through a number of iterative filtration cycles in the filter press). When passages 2B leading to filtrate drain channel 21 and filtrate ports 20 begin to widen from erosion/wear, the operational status may subjectively or objectively change from "okay" to "worn", without limitation. At the discretion of an operator, an affected, damaged, or "worn" grid 2 may be removed from a filter plate 1 and replaced, so as to mitigate future filtration media damage or premature wear of filtration media.

As suggested in FIG. 14, grids 2 may be digitally/electronically integrated into proprietary re-ordering systems such as the FLSmidth® Customer Service Department Shopfront™. Data pertaining to an operational status of a grid 2 (e.g., "worn" or "okay" status), may be used to automatically generate a shopping cart and/or re-order spare parts as grids 2 fail in service. The operational status may comprise a Boolean "worn" condition indicator that suggests replacement is necessary when "true". This Boolean indicator value (e.g., "1" for "true" and "0" for "false") may be relayed wirelessly (e.g., via RFID signal having a carrier frequency), to a wireless inventory tracking and/or re-ordering system. The RFID signal may comprise a grid 2 identification number and the wireless inventory tracking and/or re-ordering system may be configured to store data in memory (e.g., cloud storage, database, hard drive) pertaining to quantitative metrics associated with a particular grid 2 (e.g., total number of cycles until failure, purchase date, install date, decommissioning/removal date, location installed, plate number, filter press number, etc., without limitation.

A contractor or other entity may provide a filter plate 1 having grids 2, wear monitoring devices, or as substantially described herein, or may practice any one of the methods or method steps described herein, without limitation. Moreover, a contractor or other entity may provide portions or components of a filter plate 1 or of a grid 2 for a filter plate 1 as substantially described herein, or may practice one or more of the method steps described herein, without limitation.

A contractor or other entity may provide a filter press (e.g., a horizontal automatic filter press such as the FLSmidth® AFP-IV automatic filter press, without limitation), a filter plate 1, one or more grids 2 configured to be installed in a respective number of openings 18 in the filter plate 1, or a combination or component thereof. Or, a contractor or other entity may operate the same in whole, or in part.

A contractor or other entity may fabricate a filter plate 1 and/or grid 2 as substantially shown and described herein, or convert an existing filter plate 1 by adding (e.g., by way of machining, milling, or router) one or more openings 18 and a respective number of grids 2 as described and/or shown, in order to arrive at the filter plate 1 described. A contractor or other entity may receive a bid request for a project related to designing, fabricating, delivering, installing, operating, or performing maintenance on the same, without limitation. A contractor or other entity may offer to design a similar system, device, or apparatus, or provide a process or service pertaining thereto, for a client. A contractor or other entity may offer to retrofit or may retrofit an existing filter plate 1 with any one or more of the components described herein (e.g., openings 18, flanges 24, replaceable grids 2, or the like, without limitation), to make an improved filter plate 1 configured for reuse and easy repair of damaged filtrate port areas which may be prone to wear. It is further anticipated that a contractor or other entity may, in accordance with the inventive concepts and teachings described herein, offer for sale, sell to, deliver to, and/or install one or more of the grids 2 for an end user, client, or customer, without limitation.

Although the invention has been described in terms of particular embodiments and applications, it should be appreciated that one of ordinary skill in the art, in light of this teaching, can generate additional embodiments and modifications without departing from the spirit of or exceeding the scope of the claimed invention.

REFERENCE NUMERAL IDENTIFIERS

1. Filter Plate (E.G., chamber)
2. Grid (E.G., means for removable/replaceable filtrate ports)
   2A. Body (E.G., wearable)
   2B. Passage (E.G., for filtrate)
   2C. Pip (E.G., outward facing protuberance)
   2D. Support (E.G., inward facing protuberance)
   2E. Standoff (E.G., inward facing protuberance)
   2F. Aperture (E.G., mount for fastener)
   2G. Shelf surface (E.G., bottom out for fastener flange or head)
   2H. Countersink (E.G., clearance for fastener flange or head)
   2I. Channels (E.G., outward facing)
   2J. Channels (E.G., inward facing)
   2K. Transition (E.G., smooth fillet, chamfer, radius)
   2L. Filament Wire (E.G., breaks when filtrate ports grow/wear out)
   2M. Onboard circuit (E.G., with battery and processor)
   2N. RFID Tag (E.G., for alerting or reporting status of filament wire)
   2P. Wireless Signal (E.G., alarm signal, True/False flag)
3. Sealing Edge (E.G., lower)
   3A. Body
   3B. Substrate
   3C. Passage
5. Counter weight (E.G., plate)
6. Pin (E.G., weld)
7. Fastener (E.G., screw, bolt, cap head, hexagon socket head, quarter turn, snap fit)
8. Fastener (E.G., screw, bolt, cap head, hexagon socket head, quarter turn, snap fit)
9. Washer (E.G., spring lock)
10. Washer (E.G., spring lock)
11. Nut (E.G., hexagon)
12. Pipe (E.G., 2", NPT both ends)
13. Cap (E.G., FPT)
14. Bar (E.G., shaker)
15. Handle (E.G., guided)
16. Handle (E.G., non-guided)
17. Bracket (E.G., mounting)
18. Openings (E.G., through hole)
19. Slurry port (E.G., feed eye opening)
20. Filtrate port
21. Filtrate drain channel
22. Stay bosses
23. Shelf surface
24. Flange (E.G., inner ridge)
26. Recess

The invention claimed is:

1. A filter plate (1) or a filter press comprising:
   a slurry port (19);
   a filtrate port (20); and,
   a filtrate drain channel (21) intersecting the filtrate port (20);
   an opening (18) configured to receive at least one grid (2); and
   the at least one grid (2) provided within the opening (18);
   wherein the at least one grid (2) comprises a body (2A) and one or more passages (2B) extending through the body (2A) for filtrate to flow through;
   wherein the one or more passages (2B) are configured to allow filtrate to pass through the body (2A) and to the filtrate drain channel (21) and/or the filtrate port (20);
   wherein when the one or more passages (2B) in the at least one grid (2) grow as they wear from abrasion during operation; the at least one grid (2) is configured to be replaced with another grid (2) having smaller passages (2B)—thereby eliminating the need to completely replace the filter plate (1);
   wherein the at least one grid (2) further comprises a wear detection device, the wear detection device comprising at least one filament wire (2L) surrounding the one or more passages (2B) and forming a portion of a battery-powered onboard circuit (2M).

2. The filter plate (1) according to claim 1, wherein the at least one grid (2) provided within the opening comprises two grids (2).

3. The filter plate (1) according to claim 2, wherein the two grids (2) are connected to each other via at least one fastener (7) extending through at least one respective aperture (2F).

4. The filter plate (1) according to claim 1, wherein the at least one grid (2) comprises at least one support (2D) in the form of an inward facing protuberance.

5. The filter plate (1) according to claim 1, wherein the at least one grid (2) comprises a plurality of pips (2C) each in the form of an outward facing protuberance; wherein at least one outward facing channel (21) is defined between multiple pips (2C).

6. The filter plate (1) according to claim 1, wherein the at least one grid (2) comprises at least one inward facing channel (2J) defined between multiple supports (2D); the at least one inward facing channel (2J) operatively communicating with the filtrate drain channel (21).

7. The filter plate (1) according to claim 1, wherein the at least one grid (2) comprises at least one standoff (2E) in the form of an inward facing protuberance.

8. The filter plate (1) according to claim 7, wherein at least one aperture (2F) extends through said at least one standoff (2E).

9. The filter plate (1) according to claim 1, wherein the opening (18) comprises a flange (24) which defines a shelf surface (23);
   wherein the body (2A) of the at least one grid (2) is configured to rest on the shelf surface (23).

10. The filter plate (1) according to claim 9, wherein the flange (24) defines two shelf surfaces (23);
    wherein the body (2A) of a first grid (2) rests on one of the two shelf surfaces (23); and,
    wherein the body (2A) of a second grid (2) rests on the other of said two shelf surfaces (23).

11. The filter plate (1) according to claim 1, wherein the at least one grid (2) comprises at least one countersink (2H) in the body (2A), the countersink (2H) defining a shelf surface (2G) which is configured to support a fastener (7), a head of a screw or bolt, a washer (9), or a nut (11).

12. The filter plate (1) according to claim 1, wherein the onboard circuit (2M) comprises an RFID tag (2N) which is configured to wirelessly communicate a signal (2P) relaying or indicating a physical and/or operational status of the at least one filament wire (2L).

13. The filter plate (1) according to claim 1, wherein the onboard circuit (2M) comprises a diode which is configured to wirelessly communicate a sound or light signal (2P) for relaying or indicating a physical and/or operational status of the at least one filament wire (2L).

14. The filter plate (1) according to claim 1, wherein the onboard circuit (2M) comprises an RFID tag (2N) which is configured to wirelessly communicate a signal (2P) for relaying or indicating a physical and/or operational status of the at least one filament wire (2L).

* * * * *